Aug. 18, 1964 R. A. CAIPEN 3,145,162
HEAT REACTION METHOD FOR SEPARATION OF PAPER SHEETS
Filed Dec. 14, 1961 2 Sheets-Sheet 1
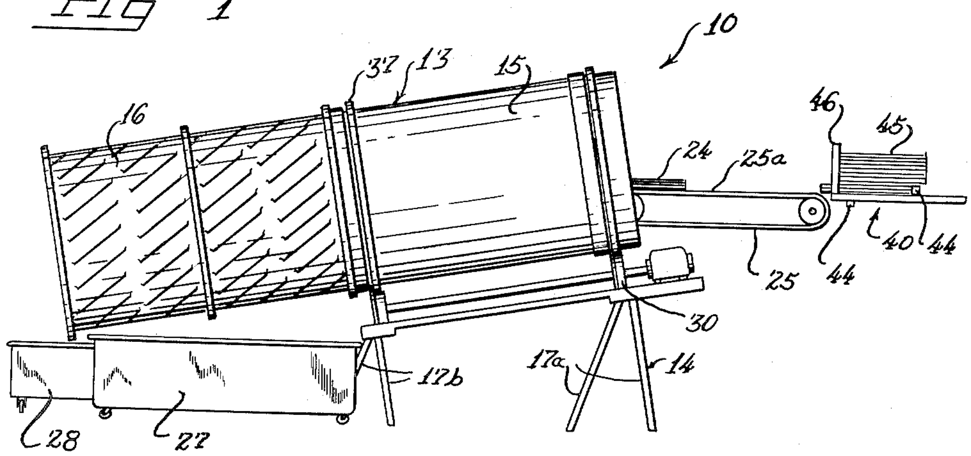
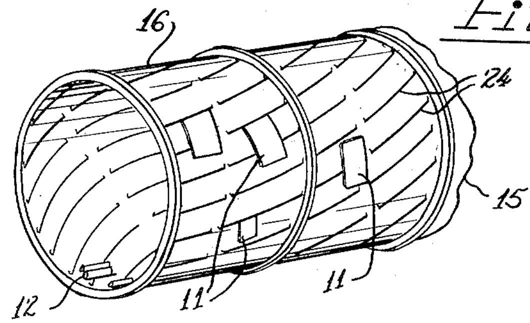
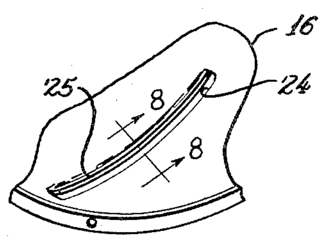
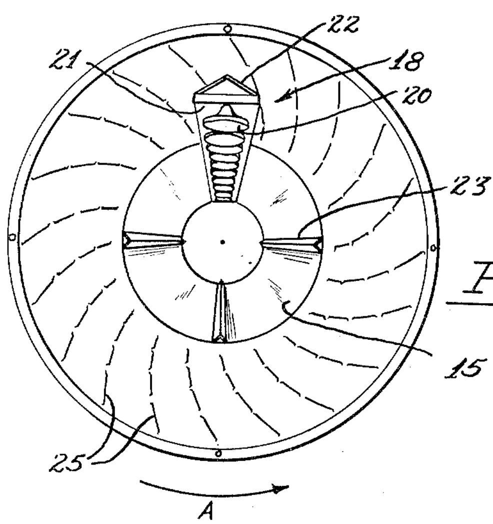
INVENTOR.
*Robert A. Caipen*
BY
*Olson, Mecklenburger, von Holst, Pendleton & Neuman* Attys Aug. 18, 1964 R. A. CAIPEN 3,145,162
HEAT REACTION METHOD FOR SEPARATION OF PAPER SHEETS
Filed Dec. 14, 1961 2 Sheets-Sheet 2
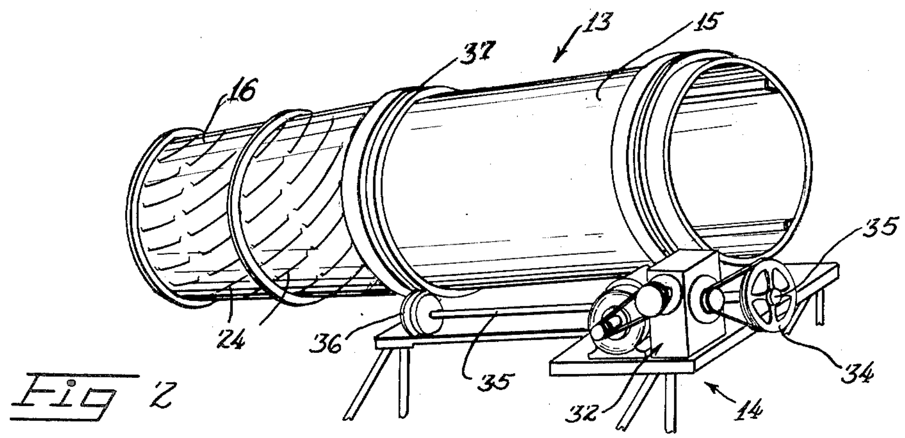
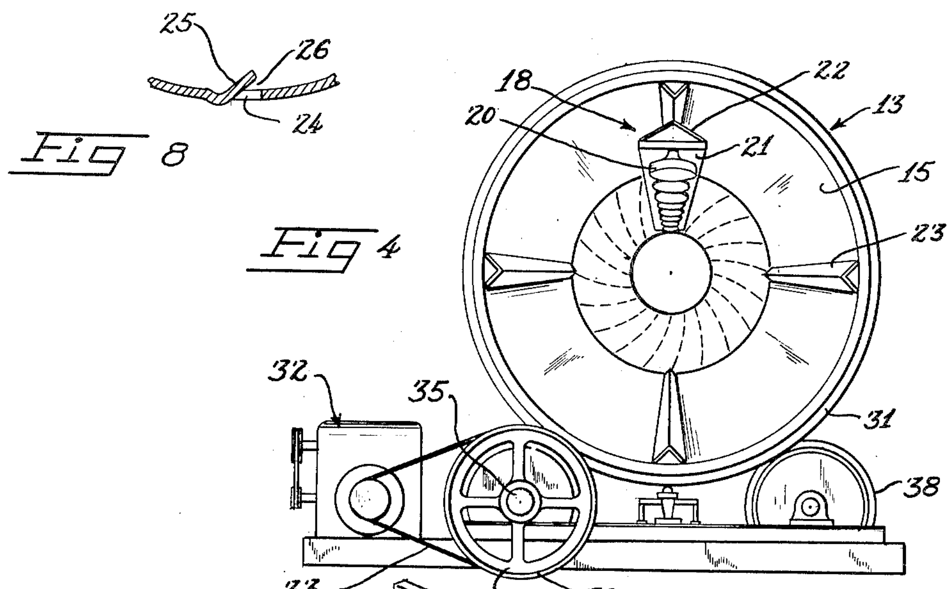
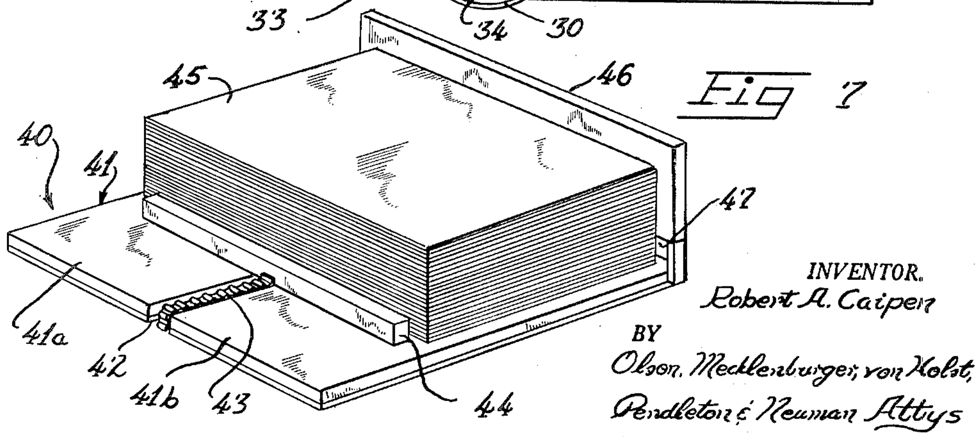
INVENTOR.
Robert A. Caipen
BY
Olson, Mecklenburger, von Holst, Pendleton & Neuman Attys United States Patent Office 3,145,162

Patented Aug. 18, 1964

1

3,145,162

HEAT REACTION METHOD FOR SEPARATION OF PAPER SHEETS

Robert A. Caipen, Tallmadge, Ohio, assignor to Packaging Corporation of America, Dover, Del., a corporation of Delaware Filed Dec. 14, 1961, Ser. No. 159,378
2 Claims. (Cl. 209—11)

This invention relates to a method of sorting paper and more particularly in relation to reclaiming certain types of waste paper.

In the manufacture of numerous types of paper products certain types of waste paper constitute an important raw material or ingredient. Adequate sources, however, of high quality waste paper for this purpose are oftentimes difficult to find, and thus the cost of such waste paper is high.

One source of high quality waste paper, heretofore considered worthless is that of carbon paper manifolds. Such manifolds normally consist of numerous sheets of high quality ledger paper interleaved with sheets of carbon paper. In the manufacture of these manifolds a high percentage of waste is occasioned due to error in printing, assembly, etc. The worthlessness of such manifolds was due to the fact that the high quality ledger paper had to be sorted from the carbon paper before use, because of the extensive coloring and poor pulping characteristics of the carbon paper. Prior efforts in accomplishing this result were inefficient and costly because of the involvement of a substantial amount of manual labor.

Thus, it is one of the objects of this invention to provide a method which facilitates the reclaiming of valuable high quality waste paper from sources heretofore considered valueless.

It is a further object of this invention to provide a method for sorting paper which is simple, inexpensive, and expeditious.

Further and additional objects will appear from the description, accompanying drawings, and appended claims.

In accordance with one embodiment of this invention an apparatus is provided which comprises an elongated drumlike member power actuated for rotation in one direction about its longitudinal axis. The drumlike member includes an infeed section which is adapted to receive the interleaved flat sheets of heat reactive paper (e.g., carbon paper) and non-heat reactive paper (e.g., ledger paper). The infeed section is provided with means for effecting separation of the sheets of heat reactive and non-heat reactive paper. The drumlike member also includes a discharge section which is coaxially disposed and rotatable with the infeed section. The separated sheets of paper while disposed within the infeed section are subjected to heat whereby the heat reactive paper sheets will curl or roll up while the non-heat reactive sheets remain substantially flat. The discharge section is provided with a plurality of passageways which are sized to accommodate and permit passage therethrough of only substantially flat separated sheets.

For a more complete understanding of this invention reference should be made to the drawings wherein:

FIG. 1 is a fragmentary side elevational view of the improved apparatus.

2

FIG. 2 is a fragmentary perspective view of the drumlike member taken from the infeed end thereof.

FIG. 3 is an enlarged fragmentary left end view of FIG. 1.

FIG. 4 is similar to FIG. 3 but taken from the opposite end of the drumlike member.

FIG. 5 is a fragmentary perspective view of the discharge section of the drumlike member nad showing sheets of non-heat reactive paper passing through the passageways formed in the wall thereof.

FIG. 6 is an enlarged fragmentary perspective view of one of the passageways formed in the wall of the discharge section of the drumlike member.

FIG. 7 is an enlarged fragmentary perspective view of the feed mechanism shown in FIG. 1.

FIG. 8 is an enlarged fragmentary sectional view taken along line 8—8 of FIG. 6.

Referring now to the drawings an apparatus 10 is shown for use in sorting sheets 11 of non-heat reactive paper (e.g., ledger paper) from sheets 12 of heat reactive paper (e.g., carbon paper), see FIG. 5.

For the purposes of describing and claiming the invention the term "non-heat reactive paper" is intended to mean paper which will remain in a substantially flat condition when subjected to heat up to approximately 150° F. The term "heat reactive paper," on the other hand, is intended to mean paper which will curl or roll up into loose cylinders when subjected to heat up to approximately 150° F. Likewise, the term "manifold" herein referred to is intended to mean a stack or pile of papers wherein non-heat reactive and heat reactive paper sheets are interleaved with respect to one another.

In certain types of manifolds, such as a carbon paper manifold, ledger sheets made of high quality paper are interleaved with sheets of carbon paper. A corresponding side of each of the manifold sheets is normally bound to the adjacent sheets. Where binding of the marginal portions of the manifold sheets has occurred, such marginal portions are severed by a conventional cutting machine before such manifolds are fed to the apparatus 10.

Apparatus 10, as shown in FIG. 1, comprises an elongated drumlike member, or cylinder 13, which is supported by a base 14 for rotation in one direction about its longitudinal axis. The member 13 includes an infeed section 15 and a discharge section 16. The two sections are rigidly connected in end to end relation and rotate as a unit about a common axis. The axis of rotation is normally inclined downwardly approximately 20 degrees from the infeed end thereof. The angular disposition of the rotational axis may be adjusted as desired, by increasing or decreasing the lengths of the legs **17*a* and 17*b* forming a part of base 14**.

The interior of member 13 is heated to approximately 150° F. One way of attaining such an interior temperature is shown in FIGS. 3 and 4 and consists of a bank 18 of electric lights. The wattage of each of the individual lamps 20 is rather high so that each lamp will radiate a considerable amount of heat. The lamps 20 are mounted on an elongated socket panel 21 which has a length approximating the longitudinal length of member 13. The panel 21 is disposed above and substantially parallel to the rotational axis of member 13, see FIG. 3, and is provided along its upper surface with a deflector plate 22. The deflector plate prevents sheets of the carbon or ledger paper becoming caught on the panel 21 and thus causing a possible fire hazard. The opposite ends of the panel 21 may be suitably supported in a fixed position by brackets, not shown. To increase or decrease the interior temperature of member 13, the number or size of lamps 20 may be varied. In normal operation, however, a temperature of approximately 150° F. is optimum. Various other means may be utilized for attaining the desired interior temperature, e.g., heating the outside surface of member 13. It is to be understood, therefore, that the invention is not intended to be limited to the illustrated embodiment.

Infeed section 15, as seen in FIGS. 2–4, is provided with a plurality of symmetrically arranged, inwardly projecting ribs or vanes 23 mounted on the interior surface of the infeed section. The vanes, in the illustrated embodiment, are disposed substantially parallel to the axis of rotation and extend substantially the full axial length of infeed section 15. The function of the vanes 23 is to cause separation of the stacked interleaved sheets 24 which are fed into the upper end of member 13 by a conveyor 25, see FIG. 1. By separating the sheets from the stack, the surface of each individual sheet will be exposed to the high interior temperature of member 13. As aforeindicated member 13 is rotated about its longitudinal axis at a relatively slow speed and in one direction, so that the vanes 23 coupled with the rotation of member 13, produce a tumbling action for the sheets of paper. The sheets of carbon paper, when exposed to the interior temperature of section 13, will inherently curl or roll up into loosely formed cylinders. The sheets of ledger paper, on the other hand, are unaffected by the heat and remain substantially flat. Due to the downward incline of the member 13, the rolled up sheets and the substantially flat sheets will automatically move toward the discharge section 16.

Discharge section 16 is affixed to the lowered end of infeed section 15 and is coaxially disposed with respect thereto. Section 16, as seen in FIGS. 3, 5, and 6, is provided with a plurality of elongated slots or grooves 24 which are preferably arranged in a spiral fashion. Each slot 24 has formed along one side thereof a baffle 25 which slopes upwardly a slight amount from the interior surface of the discharge section and thus provides an entrance 26 to slot 24. The entrance 26 faces in the direction of rotation of member 13, and therefore the edge of each substantially flat sheet will readily pass through the entrance and then through the slot, see FIG. 5. The height of the entrance 26 is such that the rolled up carbon paper cannot pass therethrough.

Once the sheets have passed through slots 24, the sheets will fall by gravity into a movable bin or vessel 27, as shown in FIG. 1 or onto some other type conveying means. The cylinders 12 of carbon paper, in the illustrated embodiment, move or gravitate to the lower open end of member, see FIGS. 1 and 5, wherein they are discharged into another bin or vessel 28, or some other type conveying means.

While the slots 24 are shown to be of arcuate configuration and of a length slightly longer than the maximum width or length of the substantially flat sheet, such slots however may be considerably longer and/or extend in a direction parallel to the axis of rotation. Such modifications are intended to be included within the scope of the disclosed invention.

Member 13 may be driven in one direction (indicated by arrow A in FIG. 3) by a drive wheel 30 which is in frictional engagement with a peripheral flange 31, formed at the raised end of member 13. The source of power for the wheel is an electric motor 32, which is mounted on a suitable platform forming a part of base 14. The power from motor 32, in the illustrated embodiment, is transmitted through a belt 33 to a pulley 34 keyed to a shaft 35, to which wheel 30 is also keyed. Shaft 35 also has keyed thereto a second wheel 36 which frictionally engages a second peripheral flange 37 formed adjacent the junction of the infeed and discharge sections. A pair of supporting rollers or wheels 38 are provided on base 14, which also frictionally engage flanges 31 and 37, respectively. Other types of bearings and drive means for the drumlike member 13 may be utilized if desired.

Cooperating with the raised end of infeed section 15 is conveyor 25, on the upper segment or leg *25a* thereof is deposited a stack 24 of interleaved sheets. The stack 24 is positioned on conveyor leg *25a* by a feed mechanism 40, see FIGS. 1 and 7.

Mechanism 40, as illustrated, includes a horizontally disposed platform 41 formed of two sections *41a* and *41b* which are arranged in coplanar relation and separated from one another to form a center groove 42. Disposed within groove 42 is the upper segment 43 of a continuous chain belt. Carried by the chain belt at spaced intervals are transversely extending pusher bars 44. The height of each bar determines the number of sheets to be simultaneously removed from the bottom of a plurality of manifolds 45 or the like arranged in stacked relation on platform sections *41a* and *41b*. At the corresponding edges of platform sections *41a* and *41b*, disposed adjacent conveyor 25 is mounted an upright abutment or plate 46. The lower edge of abutment 46 is spaced above the top surface of platform 41 so as to form a passageway 47 through which bars 44 will pass and simultaneously a corresponding number of sheets removed from the bottom of stack 45. The removed sheets form a smaller stack 24 of interleaved sheets which are deposited on conveyor 25 and in turn conveyed to the raised end of infeed section 15 of member 13. Thus, the feed mechanism 40 controls the rate at which sheets are fed to member 13, and thus assures that the interleaved sheets will be properly separated within the infeed section.

Where the manifolds to be reclaimed have the individual sheets bound together along a common side, such bound side will be stripped or cut from the manifolds before the latter are placed upon platform sections *41a* and *41b*. Any suitable means may be utilized for this purpose.

The method, in this instance, of separating heat reactive sheets from non-heat reactive sheets, where the two are interleaved with respect to one another, includes the agitaing of such interleaved sheets in the presence of heat (approximately 150° F.) so that the interleaved sheets will become separated from one another and substantial surface area of each separated sheet will be exposed directly to such heat. The heat reactive sheets upon having substantial surface areas thereof exposed to such heat, will curl or roll up to form loose cylinders while the non-heat reactive sheets remain substantially flat. The rolled up and substantially flat sheets are then further agitated and caused to pass over passageways or slots whereby only the substantially flat sheets are capable of passing through said slots. The substantially flat sheets subsequent to passing through such slots are collected whereupon such collected sheets might be utilized as a raw material in the manufacture of various other paper products.

If desired, the power for operating the chain 43, conveyor 25, and member 13 may be obtained from a common source through a series of gears or belts and pulleys. Besides adjusting the legs of base 14, the speed of rotation of member 13 may be increased or decreased to vary the capacity of the apparatus.

Thus, it will be seen that a method has been provided which permits the reclaiming of a valuable raw material from a source heretofore considered worthless.

While a particular embodiment of this invention is shown above, it will be understood, of course, that the invention is not to be limited thereto, since many modifications may be made and it is contemplated, therefore, by the appended claims, to cover any such modifications as fall within the true spirit and scope of this invention.

I claim:

1. A method of sorting sheets of non-heat reactive paper from manifolds containing interleaved substantially flat sheets of heat reactive paper and non-heat reactive paper, said method including agitating said manifolds whereby the sheets thereof are separated from one another, applying heat to said separated sheets whereby said heat reactive sheets curl and said non-heat reactive sheets remain substantially flat, and agitating said heated separated sheets in a predetermined direction relative to a passageway whereby only the substantially flat sheets pass therethrough.

2. A method of sorting sheets of non-heat reactive paper from manifolds containing interleaved substantially flat sheets of heat reactive paper and non-heat reactive paper, said method including agitating said manifolds in the presence of heat to effect separation of said manifold sheets and cause curling of the heat reactive sheets while the non-heat reactive sheets remain substantially flat, and agitating said heated separated sheets in a predetermined direction relative to a passageway whereby only the substantially flat sheets pass therethrough.

References Cited in the file of this patent

UNITED STATES PATENTS

| | | |
|---|---|---|
| 257,064 | Porter | Apr. 25, 1882 |
| 1,229,236 | Cross | June 12, 1917 |
| 2,424,367 | Nicol | July 22, 1947 |

FOREIGN PATENTS

| | | |
|---|---|---|
| 672,351 | Great Britain | May 21, 1952 |